US006517660B2

(12) United States Patent
Ausnit

(10) Patent No.: US 6,517,660 B2
(45) Date of Patent: Feb. 11, 2003

(54) METHOD OF FORMING GUSSETED RECLOSABLE BAGS

(75) Inventor: Steven Ausnit, New York, NY (US)

(73) Assignee: Illinois Tool Works Inc., Glenview, IL (US)

( * ) Notice: Subject to any disclaimer, the term of this patent is extended or adjusted under 35 U.S.C. 154(b) by 121 days.

(21) Appl. No.: 09/726,731

(22) Filed: Nov. 30, 2000

(65) Prior Publication Data

US 2002/0062925 A1 May 30, 2002

(51) Int. Cl.[7] .......................... B31B 1/84; B32B 31/08; B32B 31/18

(52) U.S. Cl. ....................... 156/270; 156/269; 156/324; 53/133.4; 53/139.2; 493/215; 493/381

(58) Field of Search ................................ 156/269, 290, 156/324, 379.6, 379.8, 380.6, 510, 516, 522, 580, 583.1, 227, 182, 204, 226, 251, 554; 53/412, 133.4, 139.2; 493/213, 214, 215, 927, 381

(56) References Cited

U.S. PATENT DOCUMENTS 4,601,694 A * 7/1986 Ausnit ..................... 156/308.2
4,706,297 A * 11/1987 Ausnit ........................ 383/122
4,812,074 A * 3/1989 Ausnit et al. ............... 156/204
4,925,316 A * 5/1990 Van Erden et al. ......... 383/210
5,186,707 A * 2/1993 Barta ......................... 493/405
5,692,837 A * 12/1997 Beer ...................... 428/355 N
5,938,337 A * 8/1999 Provan et al. .............. 383/120
6,082,897 A * 7/2000 Galomb ................... 24/585.12

* cited by examiner

*Primary Examiner*—Richard Crispino
*Assistant Examiner*—Cheryl N. Hawkins
(74) *Attorney, Agent, or Firm*—Pitney, Hardin, Kipp & Szuch LLP

(57) ABSTRACT

A method of forming a reclosable gusseted bag is disclosed wherein a carrier tape webs having discrete sections of mating profile separated by profile free sections is introduced between two bag walls and sealed to the bag wall tops or adjacent thereto. The carrier tape webs are sealed to the bag wall films and cross seals are made in the bag wall films and carrier tape webs through the profile free sections. Side gussets are formed by pushing a part of the bag walls and the profile free sections of the carrier tape web between the profiles so that when the bag is closed a part of the gussets are captured between the mated profiles. A bottom gusset is formed in the bag bottom and a peel seal may be provided below the profiles.

8 Claims, 4 Drawing Sheets

METHOD OF FORMING GUSSETED RECLOSABLE BAGS

BACKGROUND OF THE INVENTION

In commonly assigned application 09/645,828 filed Aug. 25, 2000 and entitled GUSSETED ZIPPER BAG there is disclosed gusseted reclosable packaging wherein the gusset walls are captured between the mating profiles of a zipper. The wall portions that are captured by the zipper profiles are thinner than the main portions of the bag to facilitate the gussets being captured by the profiles and hence make such bags more compatible with barrier films. The present invention relates to an improved method for forming such gusseted reclosable packaging wherein both the bag sides and bottom are gusseted. The resultant bag may be filled in line with the bag formation process or individual bags may be filled.

SUMMARY OF THE INVENTION

The principal object of the present invention is to provide an improved method for manufacturing such bags in an efficient manner that readily lends itself to automated production.

The above and other objects and advantages are attained by providing first and second carrier webs with discrete, mating zipper profile sections. The zipper profile sections are separated from each other on the carrier web by zipper free sections of carrier web. The carrier webs are respectively attached to the tops of first and second bag wall films as the bag wall films are brought together. The bag wall films may be separate webs or a single, longitudinally folded web. The carrier webs are formed of thinner gauge plastic film than the bag wall films. The first and second bag wall films and first and second carrier webs are cross sealed with the carrier webs being sealed through the zipper free sections web and the assembly is cut transversely through the cross seals to form a bag. A bottom gusset is formed in the bag by reverse folding the bottom of the bag walls. If the bag walls were formed of separate films the films have to be connected either by simply sealing the bag wall film bottoms to each other or by sealing a folded bottom web to the bottoms of both bag wall films. Side gussets are then formed by pushing in the end parts of the bag walls as well as the zipper free sections of carrier web between the open zipper sections. If desired, a peel seal may be provided below the zipper profile sections to enable hermetic sealing of the bag contents and provide tamper resistance.

In a modification of the invention windows are cut in the bag wall films at the tops of the bag walls at locations that correspond to the side gussets. Rather than placing the carrier webs at the top edges of the bag films, the carrier webs are positioned on the bag wall films so that the profile free sections of carrier film cover the windows.

DETAILED DESCRIPTION OF THE PREFERRED EMBODIMENTS

Figure 8:
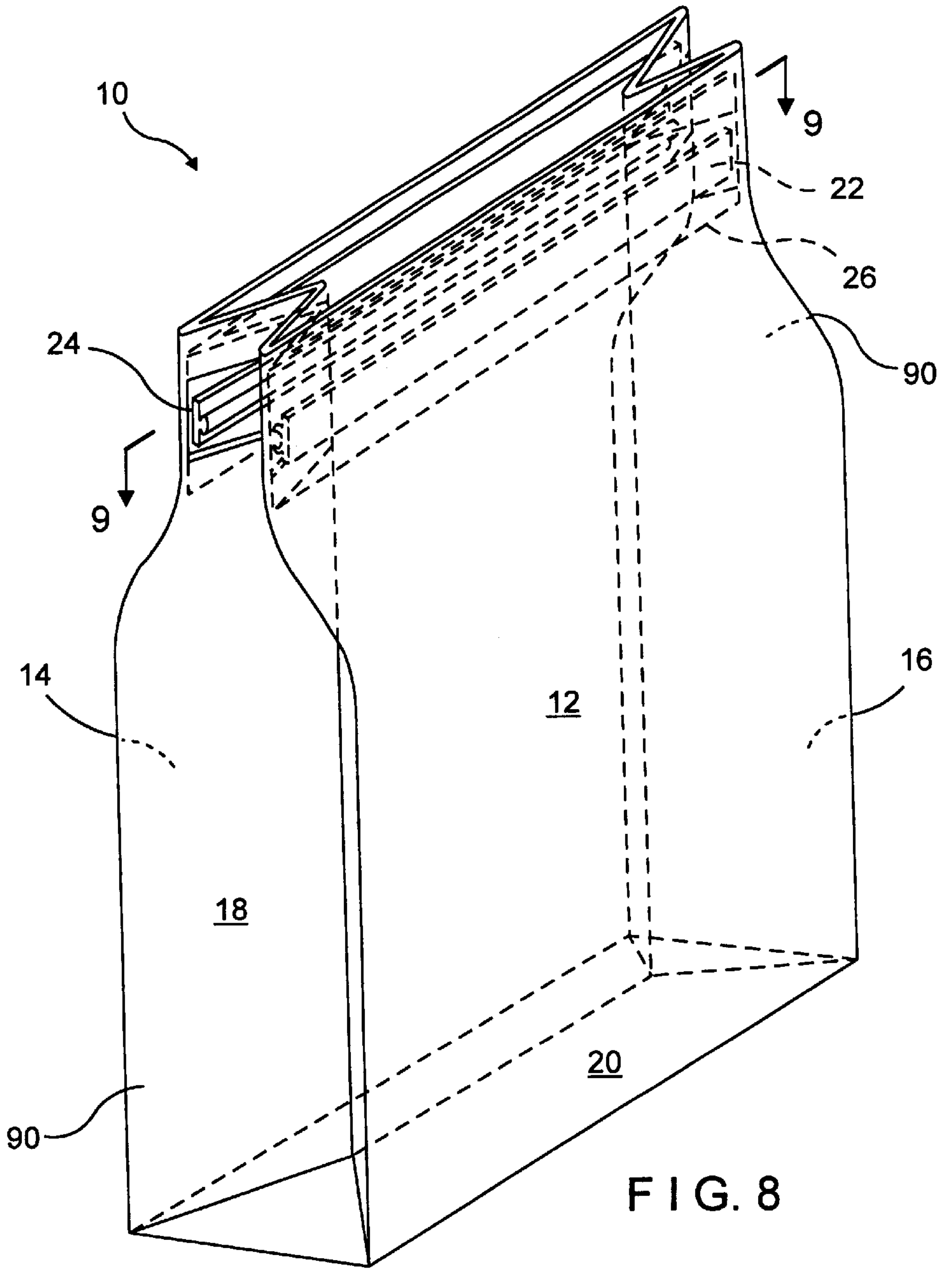
FIG. 8 is a perspective view of a gusseted reclosable bag.
Figure 9:
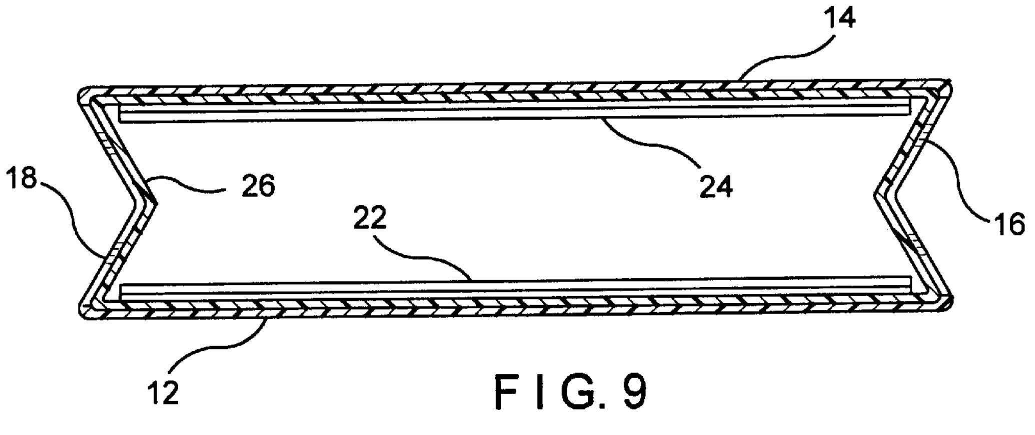
FIG. 9 is a sectional view taken along lines 9—9 of FIG. 8 in the direction indicated by the arrows.

Reference is now made to the drawings and to FIG. 8 in particular wherein a gusseted reclosable zipper bag 10 is depicted. Bag 10 includes front ant rear walls 12, 14, gusseted sides 16, 18 and a gusseted bottom 20. Mating profiles 22, 24 of a zipper respectively extend from side to side of the front and rear walls. The portions of the gusseted side walls 16, 18 to be folded within the zipper profiles are relatively thin in comparison with the remainder of the bag walls. This is attained by attaching to the bag walls a carrier web that is thinner than the bag wall film. The carrier web has discrete sections of zipper profile separated by zipper free sections of carrier web. The zipper free carrier web sections are aligned with the side gusset walls. The carrier web may be attached to the top edges of the bag wall film or the carrier web may be applied over the bag wall film on the inside of the bag walls. In the later case, windows are cut into the bag wall film to reduce the overall thickness of film exposed and to be caught between to the profiles of the finished bag. When the bag is closed, the thin carrier web profile free web sections attached to the bag side gussets are caught between the interlocked zipper profiles. To protect the bag contents a peel seal 26 may be provided below the zipper. The peel seal serves to permit the bag contents to be hermetically sealed and/or to provide tamper resistance to the package.

Figures 1, 3:
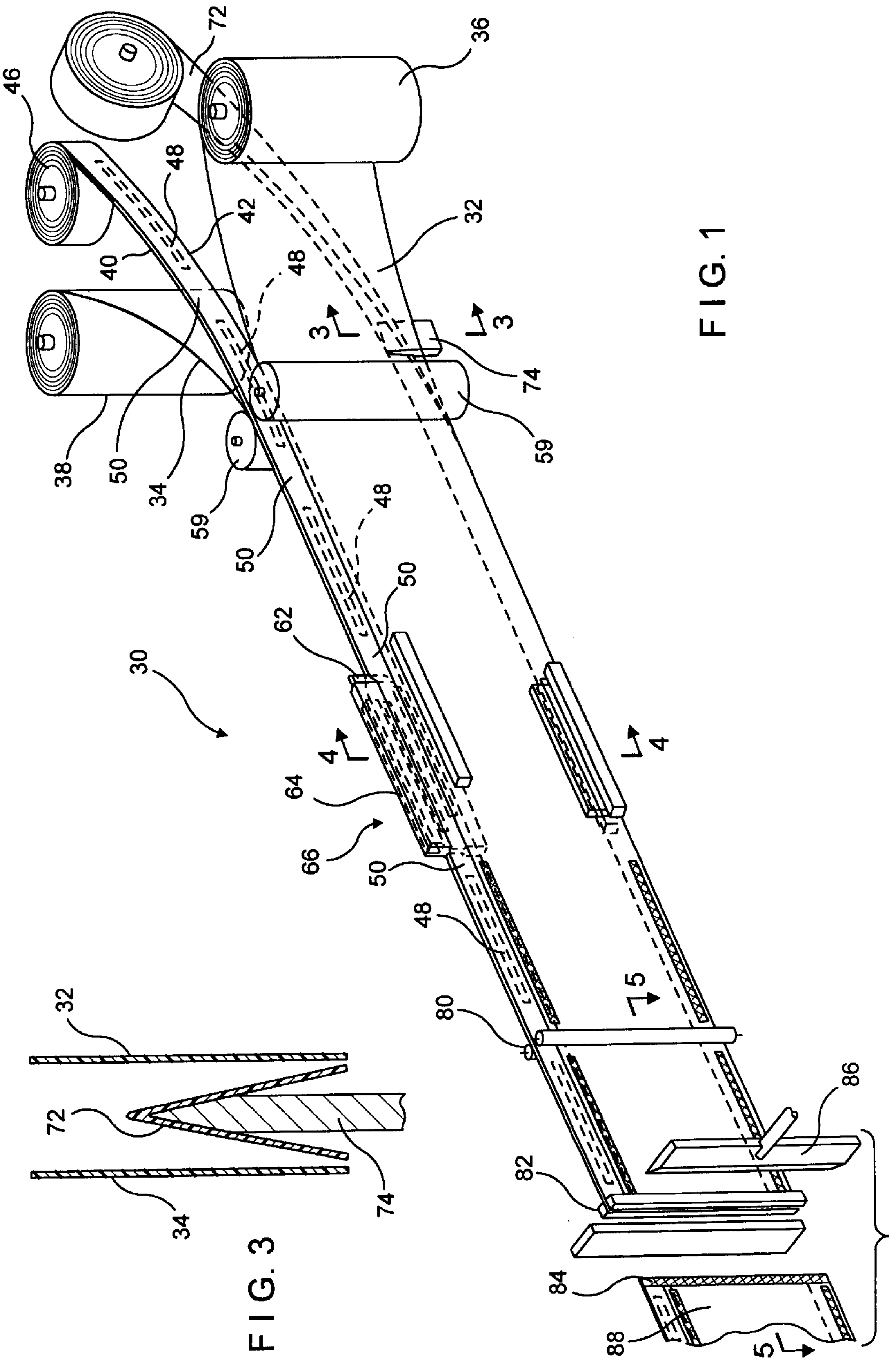
FIG. 1 is a perspective schematic view of a production line for practicing a first embodiment of the present invention.
FIG. 3 is a sectional view taken along lines 3—3 of FIG. 1 in the direction indicated by the arrows.
Figure 2:
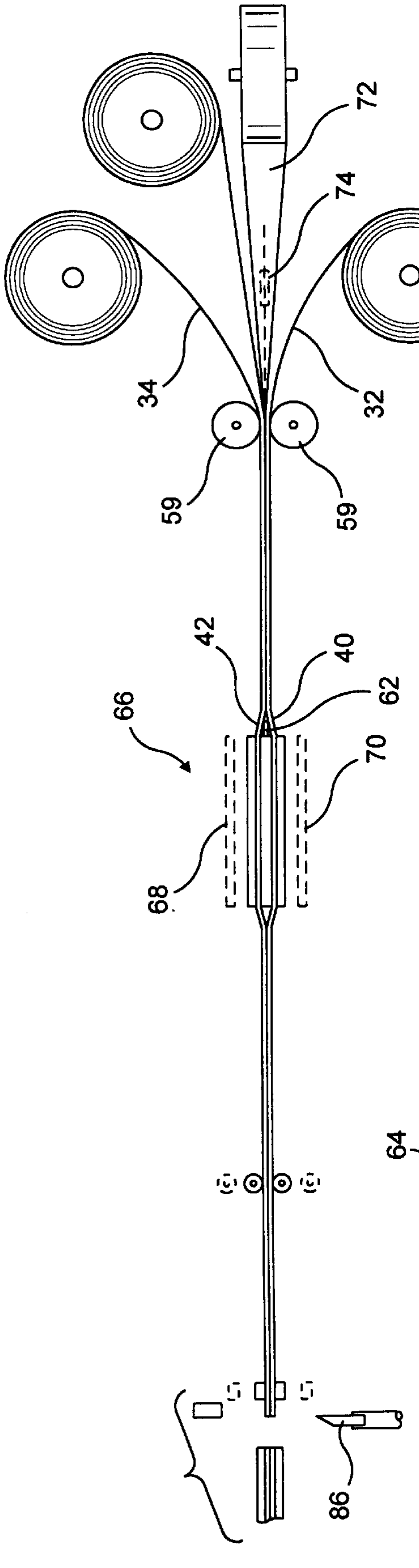
FIG. 2 is a top plan view of he production line of FIG. 1.
Figure 4:
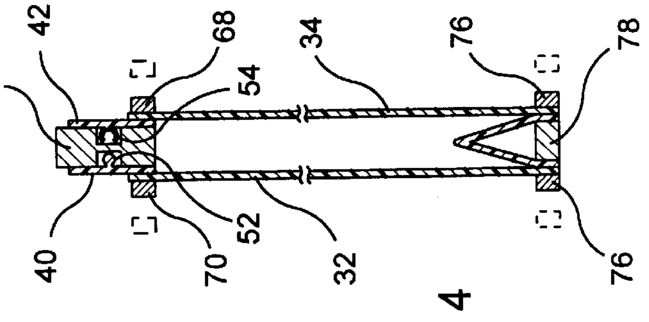
FIG. 4 is a sectional view taken along lines 4—4 of FIG. 1 in the direction indicated by the arrows.
Figure 5:
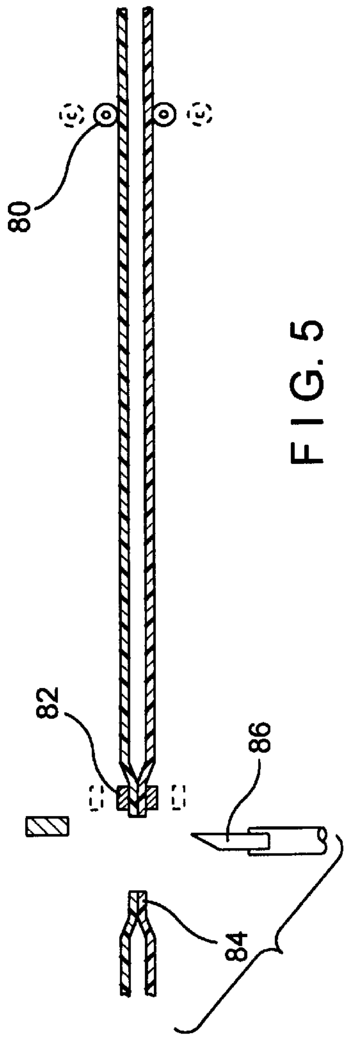
FIG. 5 is a sectional view taken along lines 5—5 of FIG. 1 in the direction indicated by the arrows.
Figure 7:
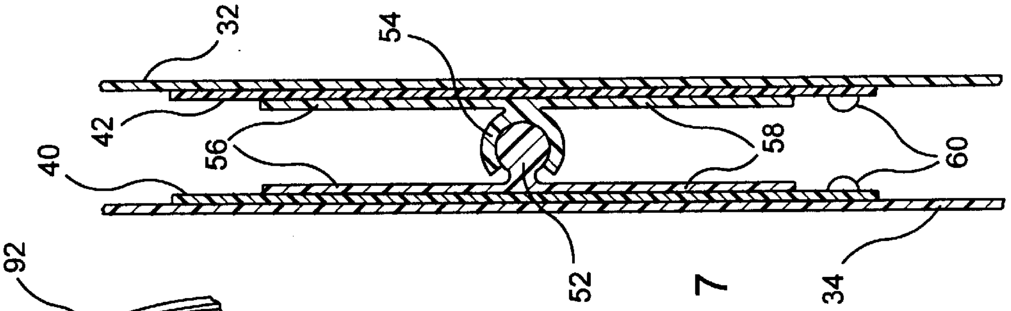
FIG. 7 is a sectional view taken along lines 7—7 of FIG. 6 in the direction indicated by the arrows.

In FIG. 1 a production line 30 for forming reclosable gusseted bags is depicted. First bag film 32 and second bag film 34 are longitudinally fed together from their respective sources 36,38. A pair of carrier webs 40, 42 are fed between the tops of the of the bag films 32, 34 from source 46. As shown in FIG. 7, each of the carrier webs 40, 42 includes a discrete section 48 of zipper profile bounded by zipper free sections 50 of the carrier webs. Such carrier webs and their method of manufacture is disclosed in co-pending application 09/678,890 filed Oct. 4, 2000 for METHOD OF MANUFACTURING CARRIER WEB ZIPPER FOR GUSSET BAGS. In this regard, one of the carrier webs 40 carries the male profile sections 52 and the other carrier web 42 carries the female profile sections 54. The profiles may also include flanges 56, 58.

One or both of the carrier webs 40, 42 may also be provided with peel seal strips 60 to enable a peel seal to be formed below the profiles of the finished bag as shown in FIG. 7.

The bag films 32, 34 and carrier tapes are driven by rollers 56 past a separator 62 which separates the male and female profiles 52, 54 and directs their associated carrier webs 40, 42 to opposite sides of an anvil 64 at sealing station 66 where seal bars 68, 70 serve to seal the carrier webs 40, 42 to the top edges of bag films 34, 32. During each cycle of the sealing station 66, a section 48 bearing profiles as well as half of the leading and lagging profile free sections 50 of the carrier webs are sealed to their associated bag films.

If the bag films 32, 34 are separate, as shown in FIG. 1, they are sealed directly together or a bottom gusset strip 72 is introduced between the bottom edges of the bag wall films. The gusset strip 72 is formed into a gusset by guide 74 and sealed to the bottom of the bag wall films 32, 34 by seal bars 76 operating against anvil 78.

The assembly is then moved between two cross sealers 80, 82 where transverse seams 84 are formed. A cutter 86 then frees the package 88. Side gussets 90 are then formed by folding the bag sides inwardly. The open bag is now filled after which the profiles are closed, capturing the carrier web profile free areas aligned with the bag side gusset walls there-between. The peel seal 26 may then be activated.

Figure 6:
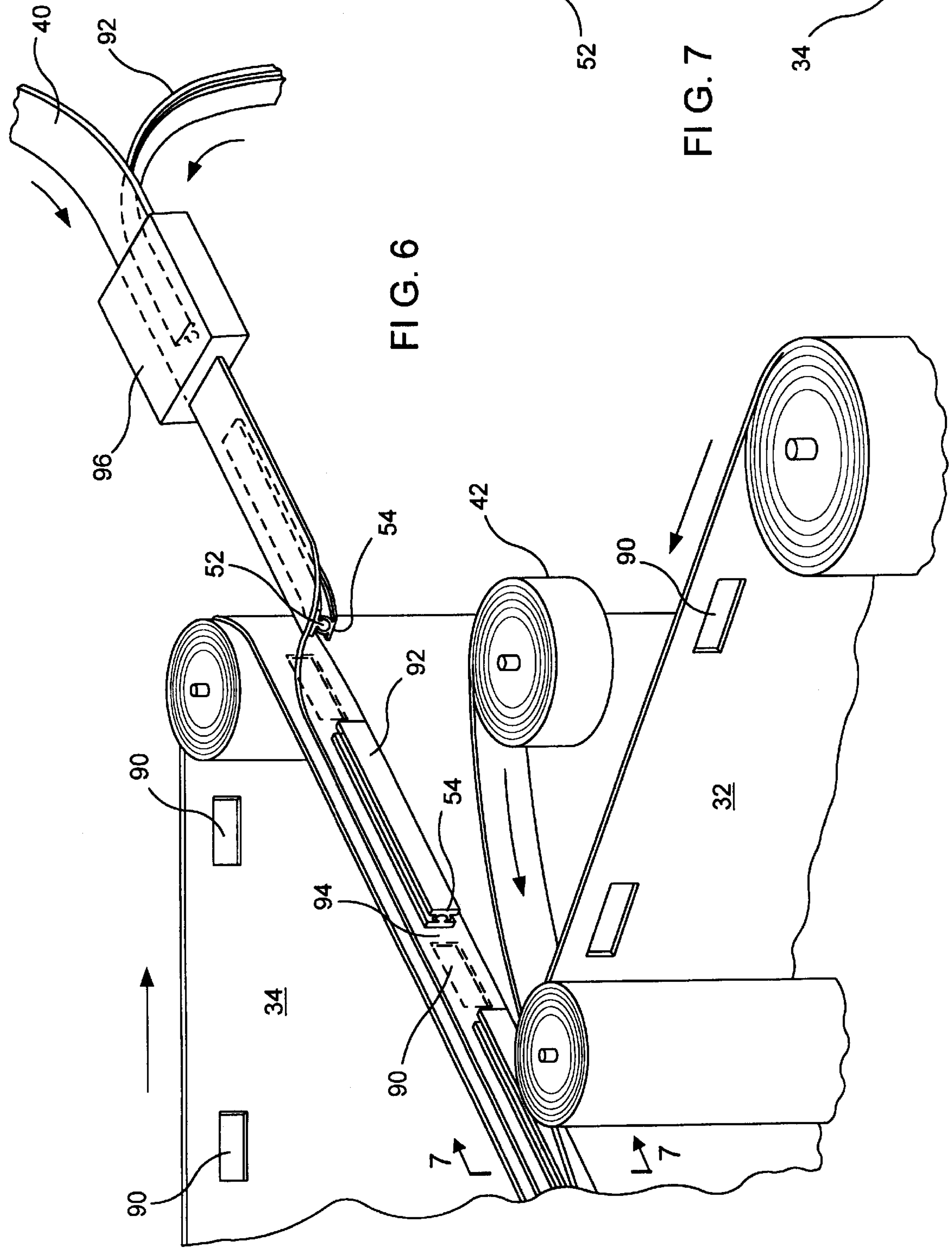
FIG. 6 is a perspective schematic view of a production line for practicing an alternate embodiment of the present invention.

In the above description, the carrier webs 48, 50 are attached to the top of the bag walls. In FIG. 6, a modification of the method of forming reclosable gusseted packaging is disclosed where adjacent the tops of the bag wall material 32, 34 cut out windows 90 are formed. Segments 92 of joined profiles 52, 54 are attached to one of the carrier webs 40 at sealing station 96 so that profile 52 is sealed to carrier web 40 while profile 54 is interlocked with profile 52. The carrier web 40 and attached zipper segments are positioned next to bag wall film 34 so that profile free segments 94 of the carrier tape overlie the windows 90. The other carrier web 42 and other bag wall film 32 with its cut out windows are then brought together with the first bag wall film 34 and carrier tape 40 is sealed to bag wall 34 while carrier tape 42 is sealed on one side to profile 54 and carrier tape 40 and on the opposite side to bag wall 32. The manufacture of the bag is as described above with the side seams 84 being formed through the substantial mid-point of adjacent bag windows. As a result, in the finished bag, the sections of the side gussets that align with the profiles are the formed only of the carrier web and hence only the carrier web will be captured between the profiles of the finished bag when the bag is closed.

Thus, in accordance with the above, the aforementioned objectives are effectively attained.

Having thus described the invention, what is claimed is:

1. A method of forming a reclosable gusseted bag comprising the steps of:

providing first and second carrier webs with discrete, mating zipper profile sections, said sections being separated from each other by zipper free sections of carrier web;

with said profile sections disengaged from one another, attaching said first and second carrier webs respectively to the tops of first and second bag wall films;

forming a bottom gusset in said bag;

cross sealing said first and second bag wall films, said first and second carrier webs through said zipper free sections of carrier web;

cutting transversely through said cross seals to form a bag; and forming side gussets by pushing said zipper free sections of carrier web between said mating zipper sections.

2. The method in accordance with claim 1 wherein said first and second carrier webs are attached to top edges of said first and second bag wall films.

3. The method in accordance with claim 1 wherein said first and second bag wall films are formed from one piece, folded longitudinally and said bottom gusset is formed by reversing said longitudinal fold.

4. The method in accordance with claim 1 wherein said first and second bag wall films are separately formed and further comprising:

attaching a bag bottom web between said first and second bag wall film bottoms, and folding said bag bottom web to form said bottom gusset.

5. The method in accordance with claim 1 wherein said first and second carrier webs are provided with said mating zipper profile sections interlocked and further comprising disengaging said profile sections prior to forming said cross seal.

6. The method in accordance with claim 1 wherein discrete windows are cut into said first and second bag wall films and said first and second carrier webs are attached to said first and second bag wall films so that their zipper free sections overlie said windows.

7. The method in accordance with claim 1 comprising the further step of providing a peel seal below said mating zipper profile sections.

8. The method in accordance with claim 1 wherein said formed reclosable bag is filled and said profile sections are interlocked capturing said profile free sections therebetween.

* * * * *